United States Patent [19]

Dean

[11] Patent Number: 5,029,042

[45] Date of Patent: Jul. 2, 1991

[54] DIELECTRIC CERAMIC WITH HIGH K, LOW DF AND FLAT TC

[75] Inventor: Terence C. Dean, Youngstown, N.Y.

[73] Assignee: Tam Ceramics, Inc., Niagara Falls, N.Y.

[21] Appl. No.: 382,459

[22] Filed: Jul. 20, 1989

Related U.S. Application Data

[63] Continuation-in-part of Ser. No. 266,433, Nov. 2, 1988, which is a continuation of Ser. No. 926,595, Nov. 3, 1986, abandoned.

[51] Int. Cl.$^5$ ........................... H01G 4/10; C09K 1/60
[52] U.S. Cl. ............................... 361/321; 252/62.3 BT
[58] Field of Search .................. 252/62.3 BT; 361/321

[56] References Cited

U.S. PATENT DOCUMENTS

| | | | |
|---|---|---|---|
| 3,028,248 | 4/1962 | Glaister | 252/62.3 BT X |
| 3,764,529 | 10/1973 | Matsuo et al. | 252/62.3 BT X |
| 4,148,853 | 4/1979 | Schuber | 252/62.3 BT X |
| 4,347,167 | 8/1982 | Payne et al. | 252/62.3 BT X |

*Primary Examiner*—Donald A. Griffin
*Attorney, Agent, or Firm*—Kenyon & Kenyon

[57] ABSTRACT

The present invention provides ceramic compositions for preparing multi-layer capacitors, having high dielectric constants between about 4900 and 5400, dissipation factors below about 2.0%, high insulation resistance capacitance products and stable temperature coefficient characteristics, by a process of mixing a major ceramic component with one or more precipitated dopant components. By controlling the conditions of the system, precipitated dopant particles are charged oppositely to major ceramic component particles and are thus associated with the major ceramic component particles.

19 Claims, No Drawings

DIELECTRIC CERAMIC WITH HIGH K, LOW DF AND FLAT TC

CROSS REFERENCE TO RELATED APPLICATION

This application is a continuation-in-part of U.S. patent application Ser. No. 07/266,433 filed Nov. 2, 1988 which is a continuation of U.S. patent application Ser. No. 06/926,595 filed on Nov. 3, 1986, now abandoned.

BACKGROUND OF THE INVENTION

The present invention relates to ceramic dielectric compositions which have high dielectric constants (K), e.g., between about 4900 and about 5400; low dissipation factors (DF), e.g., below about 2%; high insulation resistance (R) capacitance (C) products (RC), e.g., above about 7000 ohm-farads at 25° C. and above about 3000 ohm-farads at 125° C.; and stable temperature coefficient (TC) characteristics in which the dielectric constant does not alter from its base value at 25° C. by more than about plus or minus 15% over a temperature range from −55° C. to 125° C.

Multilayer ceramic capacitors (MLC's) are commonly made by casting or otherwise forming insulating layers of dielectric ceramic powder; placing thereupon conducting metal electrode layers, usually a palladium/silver alloy in the form of metallic paste; stacking the resulting elements to form the multilayer capacitor; and firing to densify the material, thus forming a multilayer ceramic capacitor. Other processes for forming MLC's are described in U.S. Pat. Nos. 3,697,950 and 3,879,645 and in U.S. patent application Ser. No. 730,711, which is incorporated herein by reference.

A high dielectric constant is important, because it allows a manufacturer to build smaller capacitors for a given capacitance. The electrical properties of many dielectric ceramic compositions may vary substantially as the temperature increases or decreases, however, and the variation of the dielectric constant and the insulation resistance with temperature and the dissipation factor, are also important factors to be considered in preparing ceramic compositions for use in multilayer capacitors.

In a desirable dielectric ceramic composition for use in a multilayer capacitor for applications requiring stability in the dielectric constant over a wide temperature range, the dielectric constant does not change from its base value at 25° C. (room temperature) by more than about plus or minus 15%. The insulation resistance and capacitance product of such a composition should be more than 1000 ohm-farads at 25° C. and more than 100 ohm-farads at maximum working temperature, 125° C. in most cases. In addition, the dissipation factor should be as close to 0% as possible.

The method commonly used to produce such temperature stable capacitors consists of firing $BaTiO_3$, used because of its high dielectric constant, together with minor ceramic oxide additives (dopants) which comprise minor amounts of elements or compounds which control the final dielectric properties. The degree of distribution of the ceramic oxide dopants throughout the barium titanate in the unfired state will determine such things as the extent of solid solution development during firing, grain growth, and the composition of the final fired grain and grain boundary. Thus, the efficiency of mixing is a key factor in the process to achieve the desired electrical properties in the finished multilayer ceramic capacitor. Until the present invention, however, the very minor amounts of ceramic oxide dopants have been very difficult to distribute in a homogeneous fashion throughout the blended ceramic dielectric composition.

It is well known that, in order for compositional development to take place during the firing stage of the manufacture of a multilayer ceramic capacitor, the particles of the ceramic oxide dopants of a dielectric composition must be in finely divided form to ensure adequate mixing of the ceramic oxide dopants with the $BaTiO_3$. Ideally, in order for complete compositional development to take place during sintering of the ceramic dielectric composition, it is understood that the minor components must disperse themselves such that the environment around each barium titanate grain is the same throughout the bulk of the composition and such that the environment within each barium titanate grain is the same throughout the bulk of the composition. Typically, this is attempted by milling the components of the composition to a particle size of approximately 1 micron. Homogeneous distribution will be enhanced, however, by introducing ceramic oxide dopants of a smaller particle size, e.g., approximately 0.1 micron while continuing to use $BaTiO_3$ particles of 1.0 micron in size. By way of illustration, using uniformly distributed powders of approximately 1 micron in spherical shape, it can be calculated that a unit of mix, prepared according to the proportions disclosed in the present invention, would contain 400 particles of barium titanate, 5 particles of niobium pentoxide and 1 particle of cobalt oxide. If, however, barium titanate powder of approximately 1.0 micron average particle size is mixed with niobium pentoxide and cobalt oxide of approximately 0.1 micron particle size, and assuming that these particles are perfectly spherical and uniformly distributed, it can be calculated that a unit of mix would contain 400 particles of barium titanate, 5000 particles of niobium pentoxide and 1000 particles of cobalt oxide. Thus for each barium titanate particle there would be approximately thirteen niobium pentoxide particles and three cobalt oxide particles. It would therefore be expected that compositional development during sintering would occur much more efficiently and the effectiveness of the ceramic oxide dopant additives would be greatly enhanced compared to that achieved by mixing 1 micron particles of the minor components.

It is well known in the art that ceramic oxide particles can be reduced in size to about 1 micron by milling techniques. It has however been impossible to mill finely divided powders on the order of 0.1 microns because milling techniques incur the risk of increasing the contamination levels of undesirable species, present in the milling media, and because milling efficiencies are significantly reduced as the particle size of the powder reaches submicron levels. The process described in this invention provides a means for enhancing uniformity of distribution of minor component dopants in a ceramic mixture before firing, and thus a means for enhancing the compositional development during sintering. This is done by precipitating minor component dopants in a finely divided form, of approximately 0.1 micron average particle size, in a controlled manner such that they are associated with major ceramic component particles. The term "associated", as used herein, identifies the heterocoagulation of unlike particles produced by precipitation in accordance with the invention as disclosed herein.

In order to precipitate 0.1 micron particles of a dopant in a slurry of 1.0 micron particles of a major ceramic component such that the 0.1 micron particles of the dopant are associated with the 1.0 micron particles of the major component, it is possible to take advantage of the surface charge properties of particles in aqueous media. These surface charge properties can be quantified in terms of zeta potential. This association maximizes the contact surface area between the two species.

It is well known that the sign and magnitude of the charge on the surface of a particle in suspension can be altered by changing the properties of the medium. Under certain conditions, it is possible to have chemically dissimilar particles in suspension which have surface charges of opposite sign. One of the most effective ways to produce particles of opposite surface charge in aqueous solution is the conventional method of altering the pH of the medium. See Reference "Dispersion of Powders in Liquids" G. D. Parfitt, Halsted Press 1969, the text of which is incorporated herein by reference.

The zeta potential of a species of particles can be determined by analysis of the behavior of the particles in suspension in a medium of a specific pH, using an electrophoresis cell in which the particle velocity is measured as a function of the applied potential gradient. The particle velocity is proportional to the zeta potential. Thus, by carrying out a series of experiments at different pH values, one will obtain a zeta potential curve, relating zeta potential and pH, which will indicate both the sign and magnitude of the surface charge of the particles in suspension over a range of pH values.

There is an important point in the zeta potential curve at which the charge on the surface of a particle is zero. This is known as the point of zero charge and sometimes is referred to as the isoelectric point (IEP). Particles in suspension at their IEP are believed to tend to agglomerate with each other due to van der Waals forces of attraction. To the contrary, particles having the same charge, either positive or negative, tend to remain separated from particles of like charge because of the coulombic forces of repulsion. If two species of particles charged oppositely to each other are in suspension, particles of the first species will attract particles of the second species and will not attract particles of the like charged species, thus forming a heterocoagulation of the species. This effect of heterocoagulation of species is important because it provides a means for associating dopant particles with major ceramic component particles and, is equally important because it prevents the homocoagulation of "like" particles. Furthermore, when the dopant particles are precipitated such that the 0.1 micron dopant particles associate in this manner with the 1.0 micron particles of the major ceramic component, then the major ceramic component particles become coated with the dopant particles. Consequently, prior to the sintering stage in the production of a multilayer ceramic capacitor, the dopant particles are precisely in the position desired to produce a uniform, dopant rich grain boundary phase surrounding a major ceramic component core grain during the sintering of the composite. This maximizes the effectiveness of the dopant as a grain growth inhibitor and enhances the electrical properties of the finished dielectric ceramic capacitor.

Thus, it is advantageous to work in a pH range in which the 0.1 micron particles of the dopant are charged oppositely to the 1.0 micron particles of the major ceramic component.

For example, where the major component is barium titanate and the dopant is niobium pentoxide, the isoelectric point of the niobium pentoxide precipitated in the process of this invention is at pH 3.1 and the isoelectric point of the barium titanate is at pH 9.0. At pH values lower than 3.1, the niobium pentoxide particles are positively charged, and at pH values higher than 3.1 the niobium pentoxide particles are negatively charged. At pH values higher than 9.0 the barium titanate particles are negatively charged and at pH values lower than 9.0 the barium titanate particles are positively charged. Therefore, in the range of pH values between 3.1 and 9.0 the niobium pentoxide particles will be negatively charged and the barium titanate particles will be positively charged. This condition favors association of the two different charged species with each other, while at the same time it causes like charged species to repel each other, and thus avoids homocoagulation which can cause uneven grain size.

The preferred pH condition would be one in which the species are oppositely charged and the magnitude of the difference between the zeta potentials of the major component particles and the dopant particles is as large as possible. This would cause the greatest attraction between the two different species, and simultaneously it would cause the greatest repulsion of like species, providing a very desirable state of dispersion of the dopant particles throughout the major component particles. For example, in the case of barium titanate and niobium pentoxide, this preferred condition would occur at pH 7, where the zeta potential of the barium titanate is +30 milivolts, and the zeta potential of the niobium pentoxide is −45 milivolts.

The advantage of precipitating the niobium pentoxide particles using the preferred pH conditions, such that the 0.1 micron particles of niobium pentoxide are associated with the 1.0 micron particles of the barium titanate and not with themselves, is that this places the niobium pentoxide particles precisely in the position desired to produce a uniform niobium pentoxide rich grain boundary phase surrounding a barium titanate core grain. This positioning of the niobium pentoxide enables it to control grain growth during the sintering of the ceramic, and the electrical properties of the dielectric ceramic capacitor are thus enhanced. It is known that niobium pentoxide diffuses very slowly at the sintering temperatures used in the production of MLC's containing barium titanate and niobium pentoxide, i.e., approximately 1300° C. Consequently, if the niobium pentoxide is not distributed uniformly around the barium titanate particles in suspension during the mixing stage, then, during the sintering stage, the slow diffusion rate will lead to non-uniformly distributed niobium pentoxide in the developing microstructure, causing uneven grain growth and consequently inferior dielectric properties. Non-uniform distribution can occur when 1.0 micron particles of niobium pentoxide and 1.0 micron particles of barium titanate are mixed in a conventional manner by dry or wet mixing the ingredients in a mill jar or the like, or when the niobium pentoxide is precipitated under conditions where homocoagulation of the barium titanate or niobium pentoxide is favored.

For the purposes of the specific examples given in this invention in which niobium pentoxide and cobalt oxalate are precipitated in a suspension of barium titanate, it should be noted that it is not necessary to precipitate the cobalt oxalate such that it associates with the barium titanate. This is true because the cobalt oxide, formed from the cobalt oxalate during firing, is present as an additive to compensate for the electronic charge imbalance created by the addition of the niobium pentoxide to the barium titanates and not as a grain growth inhibitor. Cobalt oxide diffuses very quickly at 10 the sintering temperatures used to produce MLC's and, therefore, as illustrated in the examples, its effectiveness is not necessarily reduced by its being present as a 1.0 micron powder.

The process described in this invention has the advantage of producing ceramic oxide particles of the order of 0.1 microns without the problems associated with current milling techniques.

A second advantage of the process is the production of ceramic dielectric compositions with improved electrical properties, i.e., higher dielectric constants, lower dissipation factors and higher insulation resistance capacitance products than those processed by conventional mixing techniques. The higher dielectric constant achieved as a result of this process has the important advantage of allowing capacitor manufacturing companies to produce multilayer ceramic capacitors with higher capacitance values for a given chip size, or the same capacitance values at a reduced chip size, given that the number of active insulating layers and the thickness of each insulating layer are constants. The benefits are thus reduced cost and/or miniaturization.

SUMMARY OF THE INVENTION

It is an object of the present invention to provide a mixture of particles of one or more minor ceramic oxide components with particles of a major ceramic oxide component wherein the particles of at least one of the minor ceramic oxide components are associated with the particles of the major ceramic component.

It is another object of the present invention to produce a ceramic composition having a dielectric constant between about 4900 and about 5400 at 25° C., a dissipation factor less than about 2.0%, and a stable temperature coefficient in which the dielectric constant does not vary by more than about plus or minus 15% from its reference value at 25° C.

It is another object of the present invention to produce a ceramic composition suitable for manufacturing multilayer ceramic capacitors using precious metal internal electrodes and having a dielectric constant between about 4900 and 5400 at 25° C., a dissipation factor of less than 2.0% and insulation resistance capacitance product of more than 7000 ohm farads at 25° C. and more than 3000 ohm farad at 125° C., and also having a stable TC characteristic in which the dielectric constant does not vary more than about plus or minus 15% from its reference value at 25° C.

The first stated object is achieved by the present invention, which provides a process for producing a mixture of ceramic oxides, including a major ceramic oxide component and one or more minor component dopants, wherein at least one of the minor ceramic oxide dopants must be, and the other dopant(s) may be, precipitated and wherein the process conditions are controlled such that the precipitated dopant partioles are charged oppositely to, and are associated with, the particles of the major ceramic oxide component.

The other stated objects are achieved by the present invention, which provides a process for producing a ceramic composition having high dielectric constant, low dissipation factor, and stable TC characteristics including a major component, preferably comprising high purity barium titanate, and minor component dopants, preferably comprising niobium pentoxide and cobalt oxide, wherein the niobium pentoxide dopant must be, and the cobalt oxide dopant may be, precipitated to provide the small particles of the present invention. Dielectric ceramic compositions chosen for processing according to this invention contain the major component preferably barium titanate, which comprises from about 98.5 to about 98.8 per cent by weight and the minor component dopants, preferably niobium pentoxide and cobalt oxide, which comprise from about 1.0 to about 1.1 per cent by weight and from about 0.2 to about 0.3 per cent by weight respectively.

The process described in this invention provides a method for making a dielectric ceramic having dopant particles uniformly dispersed therein comprising: dispersing major component particles in a liquid medium; precipitating dopant particles from a liquid medium containing a precursor of the dopant; dispersing the dopant particles throughout the major component particles so that dopant particles are associated with the major component particles; removing the liquid medium; and sintering.

In a more preferred embodiment, the process described in this invention provides a method for making a dielectric ceramic having dopant particles uniformly dispersed therein comprising: dispersing major component particles in a liquid medium; precipitating dopant particles from a liquid medium containing a precursor of the dopant; controlling the conditions such that the major component particles are charged oppositely to the dopant particles; dispersing the dopant particles throughout the major component particles so that the dopant particles are associated with the major component particles; removing the liquid medium; and sintering.

The invention also provides a dielectric ceramic comprising: a sintered mass of precipitated dopant particles dispersed throughout major component particles such that the dopant particles are associated with the major component particles.

The invention also provides a multilayer ceramic capacitor comprising: a plurality of dielectric ceramic layers wherein the dielectric ceramic comprises precipitated dopant particles associated with major component particles such that the dopant particles are in fixed proportion to the major component particles and such that the dielectric ceramic, when fired, has a dielectric constant between about 4900 and 5400, a dissipation factor of below about 2.0%, an insulation resistance capacitance product above about 7000 ohm-farads at 25° C. and above about 3000 ohm-farads at 125° C. and a temperature stable temperature coefficient in which the dielectric constant does not vary more than plus or minus 15% from its value at 25° C. over the temperature range from −55° C. to 125° C.; and a plurality of electrodes between the dielectric layers.

It will be understood by those skilled in the art that the term dopant precursor as used herein means the species of dopant or dopant ion present in the liquid medium prior to the precipitation step.

DETAILED DESCRIPTION OF THE INVENTION

As set forth below, the method of producing a ceramic dielectric composition of the present invention has several advantages which result in substantial technological advancement and cost savings while enhancing desirable physical and electrical properties.

The present invention provides a novel method of producing a dielectric composition having a dielectric constant between 4900 and 5400, a dissipation factor of less than 2.0%, and with stable TC characteristics. This process differs substantially from those disclosed in the prior art in which conventional mixing techniques are used and in which desirable dielectric properties, such as a higher dielectric constant, are sacrificed in order to obtain materials which have stable TC characteristics. Because conventional processes produce materials with dielectric constants not more than about 3000 to about 4700, by the use of the process of the current invention, which achieves higher dielectric constants, it is possible to produce multilayer ceramic capacitors with significantly higher capacitance values under the same physical size restriction or the smallest possible physical size under the same capacitance restriction. The higher dielectric constants also result in using significantly less ceramic and electrode material, and thus the manufacturing cost can be significantly reduced by using the process described in the current invention.

The process described in this invention provides a means for enhancing the uniformity of the distribution of the dopants in the ceramic mixture before firing by using major component powder of approximately 1.0 micron average particle size, and by precipitating one or both of the dopants in a finely divided form, approximately 0.1 micron average particle size, in a controlled manner, such that the dopant particles are associated with the major ceramic component particles. The compositional development during sintering occurs more efficiently because of increased homogeneity of the mixture and the effectiveness of the dopant additives is greatly enhanced compared to that achieved by mixing 1.0 micron particles of the dopants.

The process of the invention involves precipitating a dopant from a liquid medium and mixing the precipitated dopant with a slurry of the major component such that the dopant particles are uniformly dispersed throughout the major component particles.

In a preferred embodiment, the major component of the ceramic composition is slurried in liquid media followed by the addition of a precise amount of a solution containing a precursor of a dopant. Alternatively, the major component can be slurried in a solution containing a precursor of a dopant. The dopant is then precipitated from the solution in a finely divided form in a controlled manner such that intimate contact between the major component particles and the dopant is achieved. This procedure can be used to introduce one or more dopants. The major component is preferably chosen from the group of perovskite forming metal oxides.

In a more preferred embodiment, the major component of the ceramic composition is slurried in liquid media followed by the addition of a precise amount of a solution containing a precursor of a dopant. Alternatively, the major component can be slurried in a solution containing a precursor of a dopant. The dopant is then precipitated from the solution in a finely divided form while the charges of the major ceramic component particles and the dopant particles are controlled such that intimate contact between the major component particles and the dopant is achieved. This procedure can be used to introduce one or more dopants. The major component is preferably chosen from the group of perovskite forming metal oxides.

In an especially preferred embodiment, the major component is barium titanate ($BaTiO_3$), which is slurried in water and the two dopants are niobium pentoxide and cobalt oxide. In this embodiment the niobium pentoxide is precipitated in the presence of the barium titanate, while the cobalt oxide may be introduced to the slurry either in powder form or as a precipitate. The precursor solution of niobium pentoxide is a solution of niobium pentachloride in ethanol and the niobium pentoxide is precipitated with concentrated ammonium hydroxide.

Following filtration and washing, the intimate mixture of components may be mixed with a suitable binder composition; cast into a sheet using standard methods; formed into a multilayer capacitor structure with internal electrodes such as 70% paladium/30% silver; and fired at about 1280° C. to about 1350° C. for about 2 hours. Any conventional ceramic binder composition, which is compatible with the other materials used and which simply provides a vehicle for dispersing the ceramic particles and holding them together when the solvent is removed, may be used with this invention. Suitable binder compositions are described in "Ceramic Process Before Firing", G. Y. Onoda Jr., et al. John Wiley and Sons (1978) chapter 19. Corn syrup and polyvinyl alcohol are examples of suitable binder compositions.

The fired dielectric composition of this invention is processed into a multilayer ceramic capacitor with high dielectric constant between about 4900 and about 5400, low dissipation factors below 2%, and insulation resistance products at 25° C., 50 VDC/mil of greater than 7000 ohm-farads and at 125° C., 50 VDC/mil of greater than 3000 ohm-farads and with stable TC characteristics such that the dielectric constant does not vary by more than plus or minus 15% of the reference value at 25° C.

In another especially preferred embodiment, high purity, barium titanate (99.9 to 99.95% pure) of fine particle size (0.8 to 1.3 microns) is stirred in de-ionized water. Cobalt oxide of fine particle size 0.8 to 1.3 microns is added and the mixture is stirred continuously for 30 minutes to 33 hours to ensure adequate mixing of the two reagents. A solution of niobium pentachloride in ethanol is added to the barium titanate/cobalt oxide slurry. The ratio of barium titanate, cobalt oxide and niobium pentachloride is such that the ratio of barium titanate: niobium pentoxide : cobalt oxide in the resulting ceramic composition is 9871:107:22. The resulting slurry is stirred for 10 to 60 minutes and concentrated ammonium hydroxide is added to precipitate hydrous niobium pentoxide. The composite slurry is filtered and washed with deionized water until the washings when tested with silver nitrate/nitric acid solution, show a complete absence of silver chloride precipitate. The washed mixture of ceramic oxides is then dried in a laboratory oven at 110° C. The uniformly blended ceramic composition is then charged into a ball mill together with a binder solution made by uniformly mixing dioctylphthalate "NUOSTABE V-1444 TM ", [1] ethanol, toluene and "BUTVAR B-76 TM "[2] vinyl resin. The ratio of ceramic composition to binder is 400 : 218. The slurry is mixed for 5 to 20 hours, discharged and filtered through a 44 micron screen. This slurry, having a viscosity of about 1500 centipoise, is then de-aired and cast, in accordance with standard techniques, into a tape with a thickness of about 1.5 mils. The tape is converted into a multi-layer ceramic capacitor having 70% paladium/30% silver electrodes via conventional processes well known in the industry. The capacitors are preheated to 260° C. for 48 hours, placed on zirconia setters and sintered at 1280° C. to 1340° C. for 1 to 3 hours. The sintered capacitors have 10 active dielectric layers with dielectric thickness of about 1.1 to about 1.2 mil. Termination electrodes of Dupont TM silver paint number 4822, which is a mixture of silver and glass frit in a binder, are applied at opposite ends of the multi-layer capacitor to connect alternate electrode layers and these capacitors are fired at 815° C in a tunnel furnace. The resulting multi-layer capacitor has a dielectric constant of approximately 5400 and a dissipation factor of approximately 1.57% measured at 1KHz at 1VRMS, and TC characteristics such that the dielectric constant does not vary from its value at 25° C. by more than about ±9.9% between −55° C. and +125° C.

1. "NUOSTABE V-1444 TM" is an alkali ion free organic solvent dispersing agent available from Nuodex Co. Inc., N.J.
2. "BUTVAR B-76 TM" is a binder comprising a mixture of polyvinyl butyral, polyvinyl alcohol and polyvinyl acetate available from Monsanto Corp.

The invention will be further illustrated by the following examples, but the invention is not intended to be limited thereto. The values given for the examples herein are subject to variations based on factors known in the art.

EXAMPLE 1

500 g of high purity barium titanate was stirred in 500 g of deionized water. 1.122 g of fine particle size (1.0 micron) cobalt oxide (CoO) was added and stirring continued for 3 hours to ensure adequate mixing of the two reagents. 188.9 mls of a solution containing 28.74 grams per litre of niobium pentachloride in ethanol were added to the barium titanate/cobalt oxide slurry from a burette. The resultant slurry was stirred for 30 minutes and 20 mls of concentrated ammonium hydroxide added from a burette to bring the pH to 7.0 and to precipitate hydrous niobium pentoxide. The composite slurry was filtered and washed with deionized water until the washings when tested with silver nitrate/nitric acid solution, showed a complete absence of silver chloride precipitate. The washed mixture of ceramic oxides were then dried in a laboratory oven at 110° C.

400 grams of the uniformly blended ceramic composition was then charged into a ball mill together with 218 grams of a binder solution made by uniformly mixing 186 grams of dioctylphthalate, 90 grams NUOSTABE V-1444 TM, 597 ml of ethanol and 270 mls toluene, and 273 grams of BUTVAR B-76TM vinyl resin.

This slurry was mixed for 16 hours, discharged and filtered through a 44 micron screen. This slurry having a viscosity of about 1500 centipoise was then de-aired and cast, in accordance with standard techniques, into a tape with a thickness of about 1.5 mils. The tape was converted into a multilayer ceramic capacitor having 70 percent palladium/30 percent silver electrodes via conventional processes well known in the industry. The capacitors were preheated to 260° C. for 48 hours, placed on zirconia setters and sintered at 1280° C. to 1340° C. for 2 hours. The sintered capacitors had 10 active dielectric layers with dielectric thickness of about 1.1–1.2 mil. Termination electrodes of Dupont TM silver paint No. 4822 which is a mixture of silver and glass frit in a binder, were applied at opposite ends of the multilayer capacitor to connect alternate electrode layers and these capacitors were fired at 815° C. in a tunnel furnace. The capacitance (C), dissipation factor (DF) and capacitance change with temperature versus capacitance at 25° C. were then measured with model ES1 2110A capacitance bridge at 1 KHz measurement frequency, from −55° C. to +125° C. at about 20° C. intervals. Insulation resistance was measured at 25° C. and 125° C. after the capacitor was charged for 2 minutes at 50 VDC using a megaohmmeter M16 TM manufactured by the London Company, Ontario.

EXAMPLES 2-6

Table 1 shows the weight percent additions of niobium pentoxide and cobalt oxide to barium titanate for a series of compositions prepared according to the method described in Example 1 along with a similar series of compositions (A–H) which were prepared by the conventional mixing of 1 micron ceramic powders. In addition, the surface area, expressed as meters squared per gram, and the average particle size (d50), as determined using the Micromeritics Sedigraph TM, are given for both compositional series and illustrate the apparent difference in the physical properties of the compositions prepared by the method described in this invention and by the conventional mixing of 1 micron ceramic oxide particles.

The dielectric properties of these compositions and the composition described in Example 1 and shown in Table 2 along with those obtained from a similar series of compositions (A–H) which were prepared by conventional mixing of 1 micron ceramic oxide particles. The results clearly demonstrate the superior performance of compositions prepared by the method described in this invention. Dielectric constants are higher, within the range 4900–5400, dissipation factors are lower, about 1.6% and the RC products are higher, around 7500 ohm-farads.

EXAMPLES 7-8

In Example 7, 500 g of high purity barium titanate was stirred in a solution of 500 mls of cobalt acetate solution containing the equivalent of 2.1674 gram of cobalt oxide (CoO) per litre of deionized water. Stirring was continued for a further 30 minutes and 30 mls of a solution of oxalic acid containing 30.3 g oxalic acid dihydrate ([CO OH]2 2H2O) per 500 mls of deionized water were added to precipitate cobalt oxalate in a finely divided form. 186.8 mls of a solution of niobium pentachloride in ethanol containing the equivalent of 28.08 grams of niobium pentoxide per litre of deionized water was added to the barium titanate/cobalt oxalate suspension and the mixture stirred for 30 minutes. 20 mls of concentrated ammonium hydroxide was added dropwise to bring the pH to 7.0 and to precipitate hydrous niobium pentoxide and the composite slurry was filtered and washed with deionized water until the washings were determined to be free of chloride ions. The washed mixture was then dried in an oven at 110° C.

Multilayer ceramic capacitors were prepared from the composite slurry as described in Example 1. The electrical test results are shown in Table 3 along with those obtained for Example 8 which was prepared in similar fashion to Example 7 except that 500 mls of cobalt acetate solution containing the equivalent of 2.0798 grams cobalt oxide per litre of water was used with 179.25 mls of niobium pentachloride in ethanol solution containing the equivalent of 28.08 grams niobium pentoxide per litre of water.

The electrical results again show that a dielectric constant of greater than 500 can be obtained by precipitation of the dopants. Also, dissipation factors are below 2% and temperature stability of the dielectric constant is demonstrated over the temperature range −55° C. to 125° C. inasmuch as the dielectric constant does not vary by more than plus or minus 15% of its reference value at 25° C.

in Table 4 and are compared with those obtained from conventional mixing of 500 g of the same barium titanate with 1.0 micron cobalt oxide and niobium pentoxide in the same proportions. Once again the results showed a significant improvement in dielectric constant as a result of precipitating the dopant ingredients in a controlled manner in a finely divided form.

TABLE 1

| Example | $BaTiO_3$ | Wt % $Nb_2O_5$ | CoO | Ratio $Nb_2O_5$/CoO | Wt % $Nb_2O_5$ + CoO | Surface Area | $d_{50}$ |
|---|---|---|---|---|---|---|---|
| 1 | 98.71 | 1.07 | 0.22 | 4.86 | 1.29 | 5.09 | 1.57 |
| 2 | 98.75 | 1.04 | 0.21 | 4.95 | 1.25 | — | — |
| 3 | 98.67 | 1.10 | 0.23 | 4.78 | 1.24 | 5.00 | 1.53 |
| 4 | 98.71 | 1.07 | 0.23 | 4.65 | 1.30 | 5.01 | 1.49 |
| 5 | 98.67 | 1.09 | 0.24 | 4.54 | 1.33 | 5.00 | 1.40 |
| 6 | 98.70 | 1.06 | 0.23 | 4.61 | 1.29 | 4.96 | 1.48 |
| A* | 98.70 | 1.06 | 0.24 | 4.42 | 1.30 | — | — |
| B* | 98.67 | 1.11 | 0.22 | 5.04 | 1.33 | — | — |
| C* | 98.66 | 1.11 | 0.23 | 4.83 | 1.34 | 2.45 | 1.17 |
| D* | 98.74 | 1.03 | 0.23 | 4.48 | 1.26 | 2.99 | 1.07 |
| E* | 98.81 | 1.04 | 0.15 | 6.93 | 1.19 | 3.40 | 0.99 |
| F* | 98.78 | 1.01 | 0.21 | 4.81 | 1.22 | 2.43 | 1.26 |
| G* | 98.76 | 1.04 | 0.20 | 5.20 | 1.24 | 3.27 | 1.04 |
| H* | 98.79 | 1.00 | 0.21 | 4.76 | 1.21 | 2.67 | 1.22 |

TABLE 2

| Example | 1 KHz 1 VRMS K | DF % | TC (%) at −55° C. | −30° C. | +85° C. | +125° C. | RC 50 VDC at 25° C. | 125° C. |
|---|---|---|---|---|---|---|---|---|
| 1 | 5459 | 1.57 | +9.9 | +8.8 | −8.7 | −3.7 | — | — |
| 2 | 4963 | 1.75 | +5.5 | +6.8 | −9.9 | −5.0 | 7599 | 3641 |
| 3 | 5072 | 1.55 | +12.9 | +10.2 | −7.7 | −3.3 | — | — |
| 4 | 5266 | 1.58 | +11.7 | +9.9 | −8.4 | −.29 | — | — |
| 5 | 5107 | 1.58 | +13.9 | +11.8 | −9.2 | 5.1 | — | — |
| 6 | 5191 | 1.57 | +10.4 | +9.7 | −10.0 | −6.1 | — | — |
| A* | 4245 | 1.95 | +2.4 | +3.9 | −8.2 | −1.9 | — | — |
| B* | 4160 | 2.09 | +2.6 | +5.2 | −8.5 | −4.2 | — | — |
| C* | 3948 | 1.83 | +3.2 | +0.9 | −3.0 | +0.6 | 5971 | 2891 |
| D* | 4245 | 1.80 | +5.7 | +6.6 | −8.0 | −5.8 | 5938 | 3083 |
| E* | 4124 | 1.86 | +7.6 | +6.4 | −8.0 | −6.0 | 5727 | 3303 |
| F* | 3969 | 1.89 | +7.2 | +5.4 | −6.0 | +3.3 | 4096 | 1813 |
| G* | 4353 | 2.03 | +1.5 | +3.6 | −8.0 | −5.2 | 4320 | 1920 |
| H* | 4426 | 2.01 | +9.4 | +7.3 | −7.0 | −6.2 | 5144 | 2695 |

*Compositions prepared using conventional mixing processes and approximately 1.0 micron ceramic oxide powders.

EXAMPLE 9

500 g of high purity $BaCO_3$ and 202 g of high purity $TiO_2$ were thoroughly mixed and dispersed in about 175 ml of deionized water until a uniformly dispersed slurry was obtained. Up to 4 percent by weight of "DARVAN C TM"[3] may be added to the slurry to help disperse the powder particles. The slurry was then discharged into a drying pan and dried in an oven at about 150° C. with formed air circulation. The dried cake was then pulverized and loaded into a ceramic saggar and calcined at a temperature from about 1900° F. to about 2200° F. for about 1 hour to 5 hours. X-ray diffraction and BaO alkalinity tests on the samples indicated complete reaction and the formation of high purity $BaTiO_3$. The calcined powder was then vibratory energy milled with $ZrO_2$ media until the average particle size was reduced to 1.0 micron. Alternative methods of reducing the size to 1.0 micron might include ball milling or jet milling.

[3]. "DARVAN C TM" is an alkali ion free aqueous dispersing agent comprising a mixture of polyelectrolytes, ammonia and sulfur available from W. P. Vanderbilt Co., Conn.

500 g of the high purity barium titanate prepared as described above was then mixed with cobalt acetate and niobium pentachloride and processed as described in Example 7 to produce a composite mix of the oxides.

Multilayer ceramic capacitors were prepared as described in Example 1. The electrical results are shown

TABLE 3

|  | Example 7 | Example 8 |
|---|---|---|
| $BaTiO_3$ (wt %) | 98.71 |  |
| $Nb_2O_5$ (wt %) | 1.07 | 0.99 |
| CoO (wt %) | 0.22 | 0.21 |
| Ratio $Nb_2O_5$/CoO | 4.86 | 4.71 |
| Wt % $Nb_2O_5$ + CoO | 1.29 | 1.20 |
| Surface area m²/g | 5.10 | 5.05 |
| $d_{50}$ (Sedigraph) | 1.51 | 1.53 |
| K | 5175 | 5093 |
| dF % | 1.59 | 1.61 |
| TC (%) at |  |  |
| −55° C. | +9.7 | +10.7 |
| −30° C. | +9.2 | +9.5 |
| +85° C. | −8.4 | −9.5 |
| +125° C. | −5.1 | −6.1 |

TABLE 4

|  | Example 9 | Compared with conventionally mixing 1.0 micron powders |
|---|---|---|
| $BaTiO_3$ | 98.71 | 98.71 |
| $Nb_2O_5$ (wt %) | 1.07 | 1.07 |
| CoO (wt %) | 0.22 | 0.22 |
| Ratio $Nb_2O_5$/CoO | 4.86 | 4.86 |
| Wt % $Nb_2O_5$ + CoO | 1.29 | 1.29 |
| Surface area m²/g | 5.05 | 2.68 |
| $d_{50}$ (Sedigraph) | 1.52 | 1.05 |
| K | 3950 | 3200 |
| dF | 2.1 | 2.3 |

TABLE 4-continued

| | Example 9 | Compared with conventionally mixing 1.0 micron powders |
|---|---|---|
| TC (%) at | | |
| −55° C. | +5.0% | +4.2% |
| −30° C. | +3.5% | +4.2% |
| +85° C. | −9.7% | −9.8% |
| +125° C. | −7.2% | −1.1% |

EXAMPLE 10-11

In Example 10, 500 g of high purity barium titanate and 5.2453 g of fine particles size (1.0 micron) niobium pentoxide was added to 500 ml of cobalt acetate solution containing the equivalent of 2.1674 g of cobalt oxide (CoO) per litre of deionized water and stirred continuously for 3 hours to ensure adequate mixing of the reagents. 30 mls of a solution of oxalic acid containing 30.3 g oxalic acid dihydrate ($[COOH]_2 \cdot 2H_2O$) per 500 mls of deionized water were added to precipitate cobalt oxalate in a finely divided form. The composite slurry was filtered, washed and dried in an oven at 110° C.

Multilayer ceramic capacitors were prepared from the composite slurry as described in Example 1. The electrical test results are shown in Table 5 along with those obtained for Example 11 which was prepared in a similar fashion to Example 10 except that 500 g of high purity barium titanate and 5.0331 g of fine particle size (1.0 micron) niobium pentoxide were added to 500 mls of cobalt acetate solution containing the equivalent of 2.0798 g of cobalt oxide per 500 mls of deionized water.

TABLE 5

| | Example 10 | Example 11 |
|---|---|---|
| $BaTiO_3$ (Wt %) | 98.75 | 98.80 |
| $Nb_2O_5$ (Wt %) | 1.04 | 0.99 |
| CoO (Wt %) | 0.21 | 0.21 |
| Ratio $Nb_2O_5/CoO$ | 4.84 | 4.84 |
| Wt % $Nb_2O_5$ + CoO | 1.25 | 1.20 |
| Surface area $m^2/g$ | 2.92 | 2.94 |
| $d_{50}$ | 1.52 | 1.52 |
| K | 4372 | 4690 |
| dF % | 1.62 | 1.64 |
| TC (%) at | | |
| −55° C. | +4.0 | −2.2 |
| −30° C. | +4.5 | +0.7 |
| +85° C. | −7.2 | −10.5 |
| +125° C. | −3.0 | −6.2 |

What is claimed is:

1. A method for making a dielectric cermaic having dopant particles uniformly dispersed therein comprising:
    dispersing major component particles in a liquid medium wherein the major component particles comprise about 98.5 to about 98.8 per cent by weight;
    precipitating dopant particles from a liquid medium containing a precursor of the dopant wherein the dopant particles comprise about 1.2 to about 1.5 per cent by weight;
    dispersing the dopant articles throughout the major component particles so that the dopant particles are associated with the major component particles;
    removing the liquid medium; and
    sintering.

2. The method of claim 1 wherein the dopant particles comprise a first dopant, cobalt oxide, and a second dopant which is dispersed by precipitating it in the presence of the major component particles such that the dopant particles become associated with the major component particles.

3. The method of claim 2 wherein the dopant which is precipitated is precipitated such that the dopant particles are of a particle size of about 0.1 microns.

4. The method of claim 2 wherein the liquid medium containing the precursor of the dopant is added to the liquid medium containing the major component particles; and wherein the dopant is precipitated in the presence of the major component particles.

5. The method of claim 1 wherein the major component is barium titanate and the dopant particles comprise niobium pentoxide and cobalt oxide.

6. The method of claim 1 wherein the major component particles are dispersed in water and the precursor of the dopant is dispersed in a solution of niobium pentoxide and ethanol.

7. A dielectric cermaic comprising:
    a sintered mass of precipitated dopant particles dispersed throughout major component particles such that the dopant particles are associated with the major component particles wherein said precipitated dopant particles are smaller than said major component particles.

8. The dielectric ceramic composition of claim 7 wherein the major component is chosen from the group consisting of perovskite forming metal oxides, and the dopant particles comprise a first dopant, cobalt oxide, and a second dopant.

9. The dielectric composition of claim 8 wherein the major component comprises barium titanate and the dopant comprises niobium pentoxide.

10. The dielectric composition of claim 8 wherein the dopant comprises niobium pentoxide.

11. A multilayer cermaic capacitor comprising;
    a plurality of dielectric ceramic layers wherein the dielectric ceramic comprises precipitated niobium pentoxide particles and cobalt oxide particles associated with barium titanate particles such that the dopant particles are in fixed proportion to the major component particles and such that the dielectric ceramic when fired has a dielectric constant between about 4900 and 5400, a dissipation factor of below about 2.0%, an insulation resistance capacitance product about 7000 ohm-farads at 25° C. and above about 3000 phm-farads at 125° C. and a temperature stable temperature coefficient in which the dielectric constant does not vary more than plus or minus 15% from its value at 25° C. over the temperature range from −55° C. to 125° C.; and
    a plurality of electrodes between the dielectric layers.

12. The multilayer ceramic capacitor of claim 11 wherein the major component comprises barium titanate and the 13. A method for making a sintereable ceramic mixture having dopant particles uniformly dispersed therein comprising:
    dispersing major component particles in a liquid medium therein the major component particles comprise about 98.5 to about 98.8 per cent by weight;
    precipitating dopant particles from a liquid medium containing a precursor of the dopant wherein the dopant particles comprise about 1.2 to about 1.5 per cent by weight under conditions such that the major component particles are charged oppositely to the dopant particles;

dispersing the dopant particles throughout the major component particles, so that the dopant particles are associated with the major component particles; and removing the liquid medium.

14. The method of claim 13 wherein the conditions are controlled by maintaining the pH of the liquid media within a selected range of values.

15. The method of claim 13 wherein the dopant comprises cobalt oxide, and a compound which is dispersed by precipitation from the liquid medium in the presence of the major component particles.

16. The method of claim 15 wherein the precipitated dopant particles have a particle size of about 0.1 microns.

17. The method of claim 15 wherein the liquid medium containing the precursor of the dopant is added to the liquid medium containing the major component particles; and wherein the dopant is precipitated in the presence of the major component particles.

18. The method of claim 15 wherein the major component is barium titanate and the precipitated dopant is niobium pentoxide.

19. The method of claim 13 wherein the major component particles are dispersed in water and the precursor of the dopant is dispersed in a solution of niobium pentoxide and ethanol.

* * * * *